(12) United States Patent
Luetgert et al.

(10) Patent No.: US 8,993,094 B2
(45) Date of Patent: *Mar. 31, 2015

(54) DOOR SKIN, A METHOD OF ETCHING A PLATE FOR FORMING A WOOD GRAIN PATTERN IN THE DOOR SKIN, AND AN ETCHED PLATE FORMED THEREFROM

(71) Applicant: Masonite Corporation, Tampa, FL (US)

(72) Inventors: Karine Luetgert, Geneva, IL (US);
Christ Henry Melonio, Youngstown, OH (US)

(73) Assignee: Masonite Corporation, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/250,802

(22) Filed: Apr. 11, 2014

(65) Prior Publication Data
US 2014/0220303 A1 Aug. 7, 2014

Related U.S. Application Data

(60) Continuation of application No. 12/912,156, filed on Oct. 26, 2010, now Pat. No. 8,697,226, which is a continuation of application No. 12/028,898, filed on Feb. 11, 2008, now Pat. No. 7,820,268, which is a continuation of application No. 11/327,401, filed on Jan. 9, 2006, now Pat. No. 7,338,612, which is a division of application No. 10/346,187, filed on Jan. 17, 2003, now Pat. No. 6,988,342.

(51) Int. Cl.
| B32B 3/30 | (2006.01) |
| D06N 3/00 | (2006.01) |
| B44F 9/02 | (2006.01) |
| E06B 3/70 | (2006.01) |
| B44C 5/04 | (2006.01) |

(52) U.S. Cl.
CPC ............... *E06B 3/7001* (2013.01); *B44C 5/04* (2013.01); *B44F 9/02* (2013.01)
USPC ........... 428/151; 428/106; 428/156; 428/167; 428/172; 52/313; 52/316; 52/784.1

(58) Field of Classification Search
USPC ............... 428/106, 151, 155, 156, 167, 172; 52/313, 316, 455, 522, 784.1
See application file for complete search history.

(56) References Cited

U.S. PATENT DOCUMENTS

| 2,046,954 A | 7/1936 | La Verne |
| 2,724,642 A | 11/1955 | Brown |
| 2,854,336 A | 9/1958 | Gutknecht |
| 3,455,239 A | 7/1969 | Smith |
| 3,635,195 A | 1/1972 | Levy |

(Continued)

FOREIGN PATENT DOCUMENTS

EP 0256803 A2 2/1988

OTHER PUBLICATIONS

Philip Quanjer et al., "Society of Dutch Enamellers", Special Techniques for the Enamelist, Dec. 27, 2002.

(Continued)

*Primary Examiner* — Donald J Loney
(74) *Attorney, Agent, or Firm* — Berenato & White, LLC

(57) ABSTRACT

The present invention is directed to a door skin having an exterior surface with a wood grain pattern formed therein, and an etched plate for use as an embossing plate or with a molded die set, for forming the woodgrain pattern in the door skin.

30 Claims, 7 Drawing Sheets

(56) References Cited

U.S. PATENT DOCUMENTS

| | | |
|---|---|---|
| 3,681,797 A | 8/1972 | Messner |
| 3,770,479 A | 11/1973 | Dunning |
| 3,772,110 A | 11/1973 | Brown |
| 3,881,927 A | 5/1975 | Fantuzzo |
| 3,981,949 A | 9/1976 | Ryan et al. |
| 4,116,594 A | 9/1978 | Leanna et al. |
| 4,136,224 A | 1/1979 | Minami et al. |
| 4,213,819 A | 7/1980 | Werthmann |
| 4,294,650 A | 10/1981 | Werthmann |
| 4,550,540 A | 11/1985 | Thorn |
| 4,582,566 A | 4/1986 | Grey |
| 4,965,030 A | 10/1990 | Thorn |
| 5,075,059 A | 12/1991 | Green |
| 5,304,437 A | 4/1994 | Tennant |
| 5,322,584 A | 6/1994 | Severson et al. |
| 5,429,857 A | 7/1995 | Amemiya et al. |
| 5,472,828 A | 12/1995 | Akins et al. |
| 5,509,247 A | 4/1996 | Fortez et al. |
| 5,534,352 A | 7/1996 | Pittman et al. |
| 5,537,789 A | 7/1996 | Minke et al. |
| 5,540,026 A | 7/1996 | Gartland |
| 5,719,239 A | 2/1998 | Mirous et al. |
| RE36,240 E | 6/1999 | Minke et al. |
| 5,939,143 A | 8/1999 | Findley et al. |
| 5,950,382 A | 9/1999 | Martino |
| 6,024,908 A | 2/2000 | Koncelik |
| 6,093,356 A | 7/2000 | Albertelli |
| 6,389,768 B1 | 5/2002 | Gagne et al. |
| 6,468,439 B1 | 10/2002 | Whitehurst et al. |
| 6,479,128 B1 | 11/2002 | Schafernak et al. |
| 6,485,800 B1 | 11/2002 | Liittschwager et al. |
| 6,487,824 B1 | 12/2002 | West et al. |
| 6,579,593 B1 | 6/2003 | Mori et al. |
| 6,899,835 B2 | 5/2005 | Liittschwager et al. |
| 6,952,903 B2 | 10/2005 | West et al. |
| 6,988,342 B2 | 1/2006 | Luetgert et al. |
| 7,137,232 B2 | 11/2006 | Lynch et al. |
| 7,338,612 B2 | 3/2008 | Luetgert et al. |
| 7,367,166 B2 | 5/2008 | Luetgert et al. |
| 7,820,268 B2 | 10/2010 | Luetgert et al. |
| 7,959,817 B2 | 6/2011 | Luetgert et al. |
| 8,246,339 B2 | 8/2012 | Luetgert et al. |
| 8,535,471 B2 | 9/2013 | Luetgert et al. |
| 8,697,226 B2 * | 4/2014 | Luetgert et al. ............... 428/156 |
| 2002/0086107 A1 | 7/2002 | Paxton |
| 2003/0218663 A1 | 11/2003 | Baxter et al. |
| 2004/0139673 A1 | 7/2004 | Luetgert et al. |
| 2004/0221531 A1 | 11/2004 | Lynch et al. |
| 2005/0166402 A1 | 8/2005 | Liittschwager et al. |
| 2005/0210792 A1 | 9/2005 | Dresser |
| 2006/0071993 A1 | 4/2006 | Baxter et al. |
| 2006/0117691 A1 | 6/2006 | Leutgert et al. |
| 2007/0026197 A1 | 2/2007 | Suga et al. |
| 2010/0112288 A1 | 5/2010 | Shakir et al. |
| 2010/0242391 A1 | 9/2010 | Meersseman et al. |
| 2012/0288689 A1 | 11/2012 | Hansson et al. |

OTHER PUBLICATIONS

Gilly Hatch, "Print-Making Techniques Used by the Artist", Dec. 17, 2002.

* cited by examiner

DOOR SKIN, A METHOD OF ETCHING A PLATE FOR FORMING A WOOD GRAIN PATTERN IN THE DOOR SKIN, AND AN ETCHED PLATE FORMED THEREFROM

CROSS-REFERENCE TO RELATED APPLICATIONS AND CLAIM TO PRIORITY

This application is a continuation of U.S. patent application Ser. No. 12/912,156, filed Oct. 26, 2010, now U.S. Pat. No. 8,697,226, which is a continuation of U.S. patent application Ser. No. 12/028,898, filed Feb. 11, 2008, now U.S. Pat. No. 7,820,268, which is a continuation of U.S. patent application Ser. No. 11/327,401, filed Jan. 9, 2006, now U.S. Pat. No. 7,338,612, which is a division of U.S. patent application Ser. No. 10/346,187, filed Jan. 17, 2003, now U.S. Pat. No. 6,988,342, the complete disclosures of each of which are incorporated herein by reference.

FIELD OF THE INVENTION

The present invention is directed to an interior or exterior passage door door skin or other molded article, such as wainscot, furniture doors, cabinet doors, decorative moldings, trim products, paneling, millwork, or the like, having a naturally appearing wood grain pattern formed in an exterior surface. The invention is also directed to a method of etching a plate, for use as an embossing plate or with a molded die set, for forming a wood grain pattern in the exterior surface of the door skin, and the resulting etched plate.

BACKGROUND OF THE INVENTION

Doors having compression molded door skins are well known in the art. Attempts have been made to provide a textured pattern on the exterior of the door skin to simulate the grain of natural wood. One such attempt provides a printed wood grain pattern on the door skin. However, the printed pattern has no depth or texture, as found in natural wood. Furthermore, the print ink often fails to provide for crisp wood grain lines, and varying tones.

Another attempt to simulate a natural wood grain pattern in the exterior surface of the door skin provides for transferring a photographic image of the grain pattern onto an embossing plate, by an etching process, to form a lower surface and raised lines or ridges extending from the lower surface of the metal plate. Etching is a process whereby areas of a metal plate are covered with an acid resistant ground and an acid or mordant solution is applied to the plate. The areas that have no resistant ground are eaten away by the acid. An image or pattern is etched into the metal plate that then has a lower surface, and raised portions extending from the lower surface. The resistant ground, or "resist", controls where and how the acid eats into the metal plate. Chromed steel, copper and zinc are three most common metals used for etching plates. Chromed steel is the hardest of the three metals, and will not wear down as quickly as non-steel plates after repeated embossing.

Different acids are necessary for etching different metals. In addition, there are different resists and ways of applying the resists. There are also various ways to expose the metal to the acid after the resist has been applied so that tone and texture can be created. Acid treatment of the plate then etches out the uncoated metal, creating a raised textured surface in the embossing plate. Raised ridges, or lines, are created by etching into the plate around lines of protective resist. The acid then eats away at the metal plate, leaving raised ridges that were protected by the resist. The resulting structure creates an illusion of wood grains. The depth of the etch into the metal is controlled by the width of the corresponding line of resist that is removed.

Conventional etched plates may be used as an embossing plate, pressing the etched image or pattern into a substrate. As known in the art, the substrate is subjected to selected amounts of heat, pressure and time during embossing. When embossing a material used to form a door skin having a wood grain pattern, the etched embossing plate is pressed into the material to provide bundles of wood ticks that form the grain pattern on the resulting door skin surface. A wood grain pattern is a cluster or bundle of spaced, raised lines, or "ticks", which extend in a pattern simulating the appearance of wood. The ticks must be carefully spaced to simulate a natural wood grain. During etching, it is often difficult to achieve clear, crisp wood ticks. If the tick is too narrow, the acid may eat into the sides of the tick, and may completely destroy the tick. As such, conventional etched plates having wood grain patterns do not emboss highly realistic wood ticks. In addition, such conventional etched plates often have sharp edges on the outer surfaces of the ticks, and undercuts near the lower portions of the plate due to the nature of the etching process. As the acid eats into the metal plate, grooves are cut therein. However, the acid also eats into the sides of ticks (separated by the groove), especially near the base of the groove. This is commonly known as undercutting, a phenomenon well known in the field of etching. The resulting ticks fail to simulate the soft, flowing appearance of natural wood ticks.

In addition, conventional door skins with embossed wood grain patterns fail to capture the subtle wood tone variations found in natural wood. Natural wood includes not only wood ticks, but varying background tones as well. Conventional embossing plates and molded die sets used to form door skins with wood grain patterns fail to capture both naturally appearing wood ticks and wood tones. If the door skin surface is stained, it does not appear realistic. As commonly known in the art, stains include a dye or pigment in solution, and are generally used to color a wood by penetrating the wood surface. As such, the natural wood tones and ticks may be enhanced or colored, without covering the wood surface textures and tones, as with paint. Stains do not penetrate the surface of a synthetic door skin in the same manner as natural wood. Therefore, attempts to stain a door skin for purposes of enhancing tones and ticks is a difficult process for a typical consumer. The stain may not simply be applied with a brush or rag, and the excess wiped off, as can be done with natural wood. Rather, multiple applications of stain are generally required, which must then be selectively removed by hand. This technique often requires a professional or one experienced in staining in order to capture a realistic wood appearance. Alternatively, portions of the door skin surface may be highlighted by spray gun application of the stain, or other shading material. Even if the stain is carefully applied in specific areas, the resulting tones and wood ticks may appear splotchy and unrealistic. Thus, it is difficult to achieve the desired tonal variations.

Therefore, there is a need for a molded door skin having a wood grain pattern that may be easily stained, and that precisely captures both the wood ticks and wood tones found in natural wood grain.

SUMMARY OF THE INVENTION

The disclosed invention is directed to a molded door skin comprises an exterior surface having outer portions lying on a first plane, spaced grooves recessed from the plane of the outer portions, and halftone portions having spaced protrusions defined by channels. The channels are recessed from the plane of the outer portions.

The disclosed invention also relates to other molded construction components, comprising an exterior surface having outer portions lying on a first plane, spaced grooves recessed from the plane of the outer portions, and halftone portions having spaced protrusions defined by channels. The channels are recessed from the plane of the outer portions.

A method of etching a wood grain pattern into a plate comprises the steps of: capturing an image of a piece of wood having ticks and background tones; creating from the image a line art image substantially of modified ticks; creating from the image a background art image incorporating modified background tones; rendering a master image from the line art image and the background art image; creating a pattern transfer from the master image; applying the pattern transfer to a metal plate; and etching the metal plate according to the pattern transfer.

An embossing plate for forming a wood grain pattern into a composition material comprises an etched metallic plate a lower portion lying on a first plane, spaced ridges extending from the first plane, halftone portions having a planar portion lying on a second plane and outwardly disposed from the first plane, and spaced depressions extending from the second plane to the first plane.

A door comprises a peripheral frame, and at least one door skin. The door skin has an exterior surface with outer portions lying on a first plane, spaced grooves recessed from the plane of the outer portions, and halftone portions. The halftone portions have spaced protrusions defined by channels, wherein the channels are recessed from the plane of the outer portions.

DETAILED DESCRIPTION OF THE INVENTION

Figure 1:
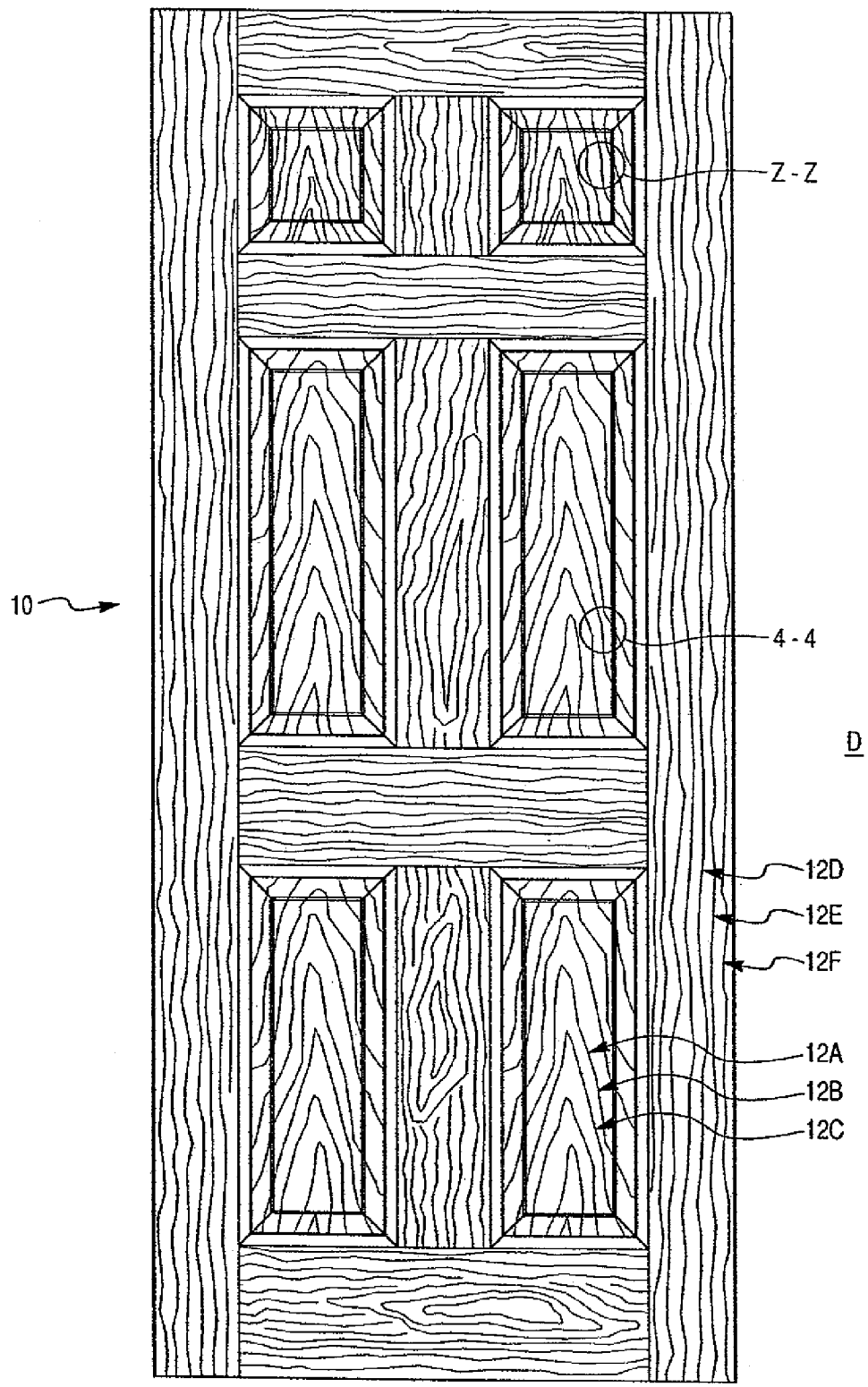
FIG. 1 is a front elevational view of a door skin having a wood grain pattern according to the present invention.
Figure 2:
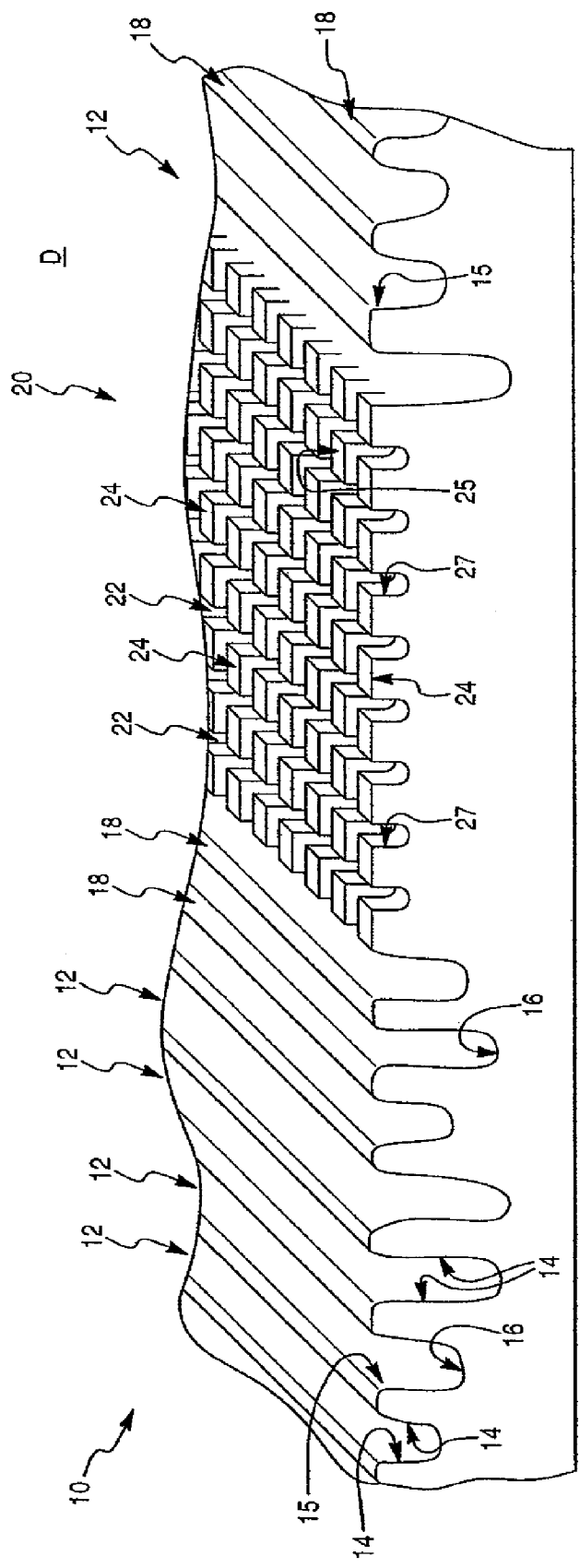
FIG. 2 is an enlarged perspective view of the circled portion 2-2 of FIG. 1.
Figure 3:
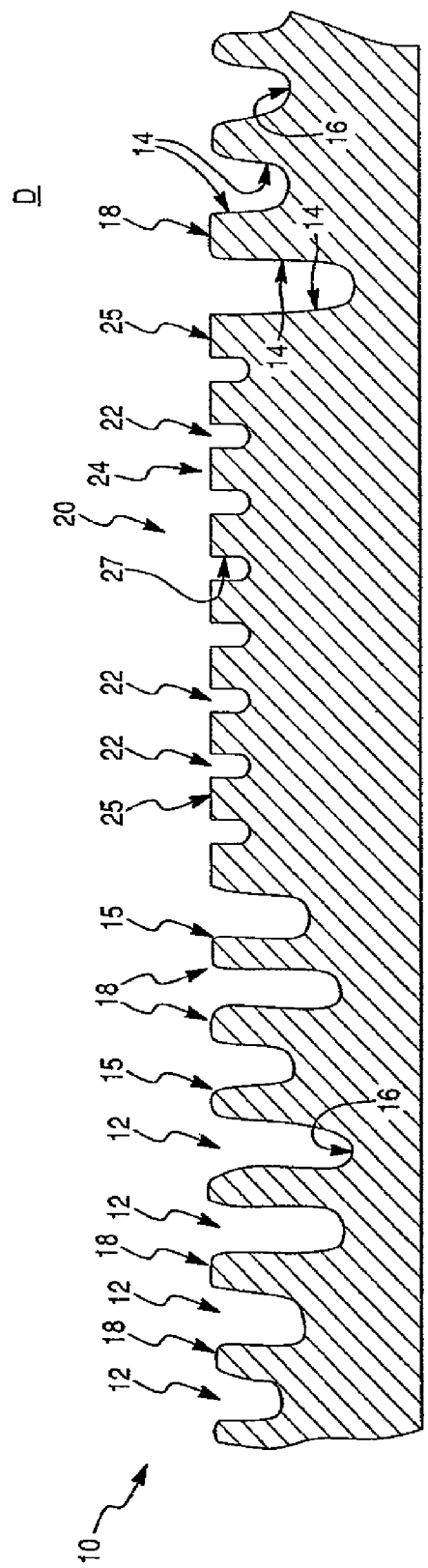
FIG. 3 is an enlarged cross-sectional view of the circled portion 2-2 of FIG. 1.

The present invention is directed to a door skin D having a naturally appearing wood grain pattern formed in an exterior surface 10, as best shown in FIG. 1. The wood grain pattern may be formed using an etched plate, such as in an embossing plate or molded die set, or other process known in the art. As best shown in FIGS. 2 and 3, exterior surface 10 of door skin D comprises a plurality of spaced grooves 12. Each one of grooves 12 is defined by opposing walls 14 and a base 16. A plurality of outer portions 18 lie on a first plane that includes the most exteriorly disposed surfaces of exterior surface 10. Interfaces 15 interconnect and are integral with outer portions 18 and walls 14. Preferably, interfaces 15 are curved. Outer portions 18 separate adjacent grooves 12. Preferably, grooves 12 are recessed from the first plane from between about 0.003 inches to about 0.013 inches, and may have variable widths. As such, outer portions 18 may also have variable widths, as best shown in FIG. 2. The depth of grooves 12 may vary beyond the preferred range depending on the substrate used to mold door skin D (or other molded article), as well as the wood species being simulated.

In addition, adjacent grooves 12 may be spaced from each other by variable distances, and extend longitudinally relative to each other by variable lengths, as best shown in FIG. 1. Grooves 12A, 12B and 12C are spaced from each other, extending in an arrowhead-like configuration, as may be found in a natural wood. Grooves 12D, 12E and 12F extend longitudinally, extending the entire length of door D. It should be understood that the configuration of grooves 12 simulates natural wood. As such, while some grooves 12 may extend substantially parallel and spaced a predetermined distance, they need not, as shown in FIG. 1. Thus, the configuration of grooves 12 simulates an appearance of soft, flowing wood ticks.

In addition, exterior surface 10 includes halftone portions 20. Each one of halftone portions 20 includes a plurality of recessed channels 22. Channels 22 are preferably recessed from the first plane of outer portions 18 to a depth of between about 0.001 to about 0.003 inches, more preferably 0.003 inches. The preferred depths simulate a wood species such as ash. However, the depths may vary beyond the preferred ranges, depending on the substrate being embossed and/or molded and the wood species being simulated. Channels 22 are configured in a grid-like pattern, and are preferably recessed from the first plane about the same depth throughout exterior surface 10. Channels 22 define a plurality of spaced protrusions 24. Spaced protrusions 24 are preferably box-shaped in configuration (as defined by the grid-like pattern of channels 22), as best shown in FIG. 2. However, spaced protrusions 24 need not be box-shaped. For example, halftone portions 20 may include a plurality of cylindrically shaped protrusions 24. Each one of spaced protrusions 24 includes a flat top 25, which is coplanar with the first plane of outer portions 18, or slightly recessed from the first plane. Spaced protrusions 24 also include sides 27 extending from channels 22 to flat tops 25. Because channels 22 are recessed from the first plane from between about 0.001 inches to about 0.003 inches, protrusions 24 correspondingly extend upward from channel portions 22 from between about 0.001 inches to about 0.003 inches. However, protrusions 24 do not extend beyond the first plane of outer portions 18 (though they may be coplanar with the first plane).

Figure 4:
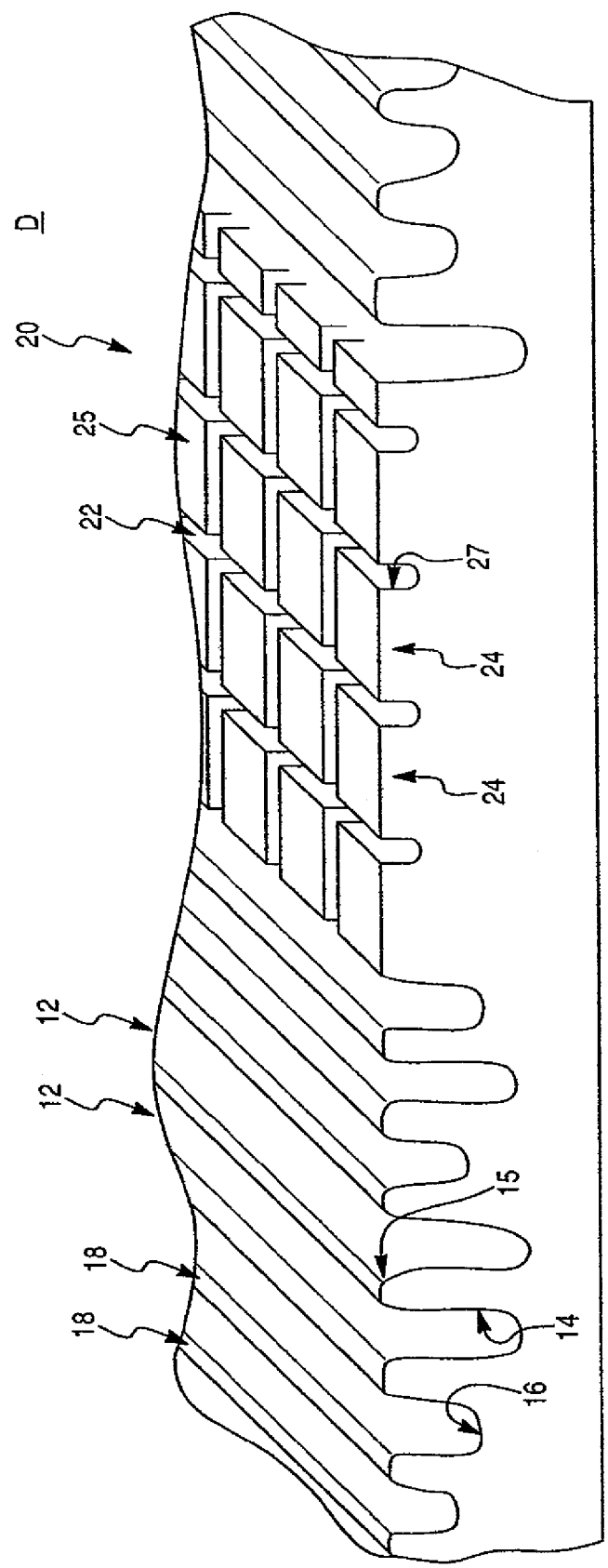
FIG. 4 is an enlarged perspective view of the circled portion 4-4 of FIG. 1.

Halftone portions 20 include varying numbers of spaced protrusions 24, depending on the spacing of channels 22. Preferably, halftone portions 20 have 133 or fewer protrusions 24 per inch. However, it should be understood that the maximum number of protrusions per inch may vary depending on the substrate used to form door skin D, or the species of wood being simulated. A halftone portion 20 having a relatively high number of protrusions 24 is best shown in FIG. 2. A halftone portion 20 having a relatively low number of protrusions 24 is best shown in FIG. 4. While halftone portions 20 are shown as disposed between grooves 12, some portion of the area between adjacent grooves 12 have no halftone portions, and thus provide a bi-color or glossy appearance after stain is applied to exterior surface 10.

As best shown in FIGS. 2 and 4, halftone portions 20 may include variably sized protrusions 24. A halftone portion 20 having a relatively high density of protrusions 24 includes smaller protrusions 24, as best shown in FIG. 2. A halftone portion 20 having a relatively low density of protrusions 24 includes larger protrusions, as best shown in FIG. 4. Channels 22 defining adjacent protrusions 24 have a substantially consistent width throughout exterior surface 10. However, adjacent channels 22 may be variably spaced, depending on the size of protrusions 24. Therefore, a halftone portion 20 having a high density of protrusions 24 includes more closely spaced channels 22, as compared to a halftone portion 20 having a low density of protrusions 24.

Therefore, exterior surface 10 of door skin D includes a plurality of grooves 12 and halftone portions 20 that simulate wood ticks and background wood tones, respectively, as found in natural wood grain. When stain is applied to exterior surface 10, varying amounts of stain accumulate in grooves 12, since grooves 12 are variably spaced and have variable widths and depths. Deeper, wider grooves 12 hold more stain as compared to shallower, narrower grooves 12. In this way, the deeper, wider grooves 12 simulate darker, more prominent wood ticks. Similarly, shallower grooves 12 simulate lighter, more delicate wood ticks. Likewise, halftone portions 20 having many, closely spaced channels 22 retain more stain as compared to halftone portions 20 having fewer channels 22 that are not as closely spaced. The more stain that is retained in a given halftone portion 20, the darker the area will appear. Thus, varying halftone portions 20 simulate varying wood tones, depending on the configuration of channels 22 and protrusions 24.

Stain may easily be applied to exterior surface 10 of door D by an end user simply by wiping the stain on exterior surface 10. The integration and configuration of grooves 12 and halftone portions 20 allow the stain to be simply wiped or brushed on by the consumer. Excess stain is then wiped off. Thus, stain is applied to the disclosed molded door skin D in the same manner as it is applied to natural wood. Furthermore, only one coat of stain may be required, depending on the preference of the end user. Preferably, a heavily pigmented stain is used, which will easily cling and congeal in grooves 12 and halftone portions 20.

Figure 5:
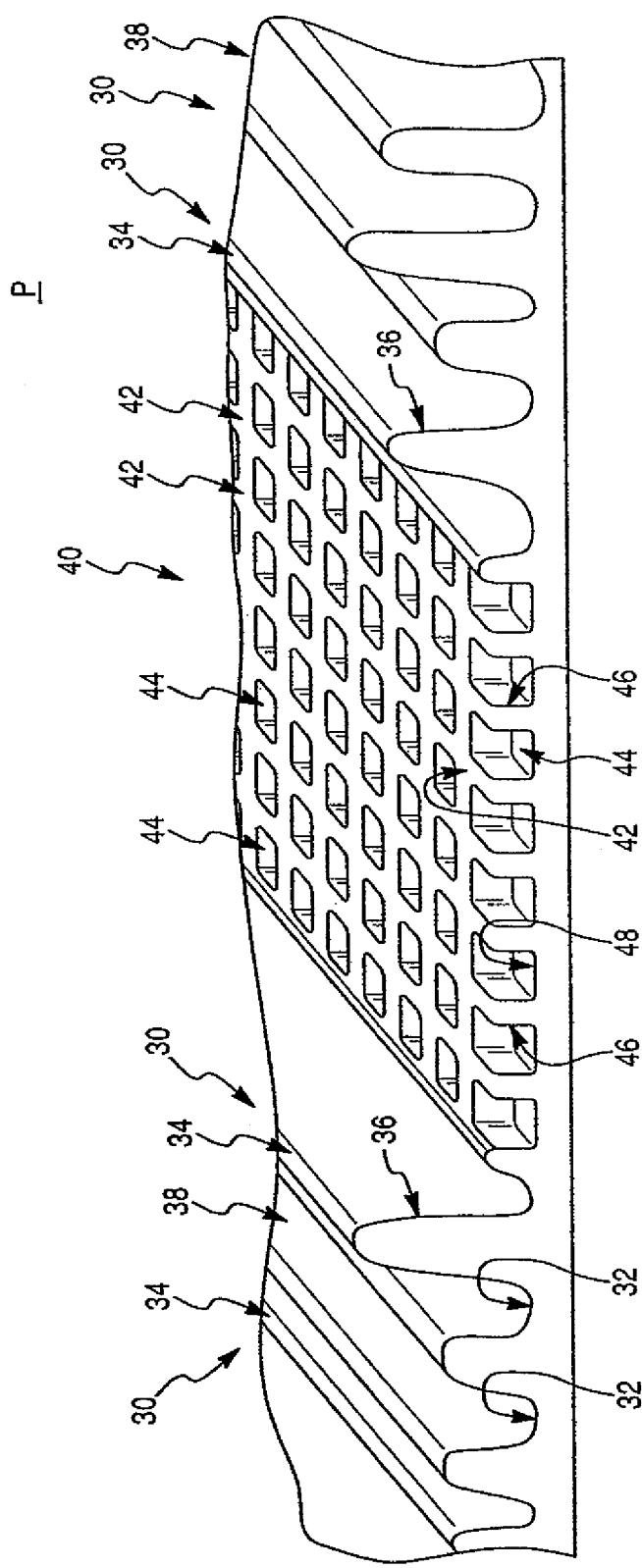
FIG. 5 is a fragmentary perspective view of an etched metal plate having lines and tonal areas.

The present invention is also directed to an etched plate P, for use as an embossing plate or with a molded die set for forming a wood grain pattern in the exterior surface of a molded article, such as door skin D. As best shown in FIG. 5, a metal plate P includes a plurality of etched lines 30 extending upwardly from lower portions 32, wherein lower portions 32 lie on a plane that include the deepest etched surfaces of a metal plate P. Lines 30 have a ridge-like configuration, and vary in height from between about 0.003 inches to about 0.013 inches. The height of lines 30 may vary depending on the particular wood species that is being simulated. Each one of lines 30 includes an upper ridge 34, and walls 36 extending from upper ridge 34 to lower portions 32. Adjacent lines 30 are separated by gaps 38, which are etched into plate P to define lines 30. Plate P has an inverse configuration to the exterior surface being formed on door D. For example, lines 30 correspond to grooves 12 of door D, and the plane of lower portions 32 correspond to the first plane of outer portions 18 and flat tops 25.

Plate P also includes tonal portions 40, which correspond to halftone portions 20 when embossing an article. For example, tonal portions 40 correspond to halftone portions 20 of door D. Tonal portions 40 include a planar area 42 with a plurality of depressions 44 spaced throughout planar area 42. Because tonal portions 40 have an inverse configuration to the halftone portion in an embossed article, such as halftone portions 20, tonal portions 40 are configured as a raised grid, as best shown in FIG. 5. As such, depressions 44 are configured as a box-like, open areas recessed from planar area 42. Depressions 44 include sides 46 and a base 48. Base 48 is coplanar with lower portions 32, or alternatively slightly raised from lower portions 32. Planar areas 42 are etched into plate P to a depth of between about 0.010 inches to about 0.014 inches, preferably 0.010 inches. Depressions 44 are etched an additional about 0.001 inches to about 0.003 inches from planar areas 42. The depth of the etch may vary depending on the particular wood species that is being simulated. As such, the grid-like configuration of planar areas 42 in tonal portions 40 has a height of about 0.001 to about 0.003 inches relative to lower portion 32.

Similar to protrusions 24, the density and size of depressions is variable in a given planar area 42. Thus, the configuration of tonal portions 40 that are etched into plate P precisely controls the tonal variations in an embossed article, such as door D. Similarly, the configuration of lines 30 that are etched into plate P control the qualities of the simulated ticks (i.e. grooves 12) in a molded or embossed article. The disclosed etched plate P may be used as an embossing plate or with a molded die set for embossing and molding a wood grain pattern into an article. The resulting surface formed by plate P creates a stainable surface, wherein the stain may be simply wiped on by the consumer.

A method of etching a plate, for use as an embossing plate or with a molded die set, integrates etching lines in a metal plate at varying heights with etching tonal portions in the plate using a screening process. Prior to etching, images of natural pieces of wood are photographed to derive the actual texture, tones and tick pattern to be simulated. Preferably, each natural wood board is prepared for photography by burning and wire brushing the board surface, which accentuates the fine ticks, background color and tone of the board. The image of the prepared board may then be captured using conventional photography methods. Alternatively, the image may be derived using digital imaging techniques, as known in the art. A plurality of boards may be photographed, each representing a stile, rail, and panel of the ultimately to be produced door skin. The boards may be of different wood species, so that the stiles and rails may be one species and the panels another species. The photographs may then be assembled into the appearance of a door, with the wood grain pattern of each board oriented as desired. Thus a naturally appearing door may be achieved, with the wood grain of the stiles oriented perpendicular to that of the rails, and the wood grain of the panel(s) oriented as desired.

The image is then altered using either conventional photographic arts or using computer imaging. Specifically, the image is processed by color separation, whereby the initial image is separated by camera or computer imaging to produce a first image showing all of the wood ticks from the initial image, and a second image showing all of the wood tones from the initial image.

Figure 6:
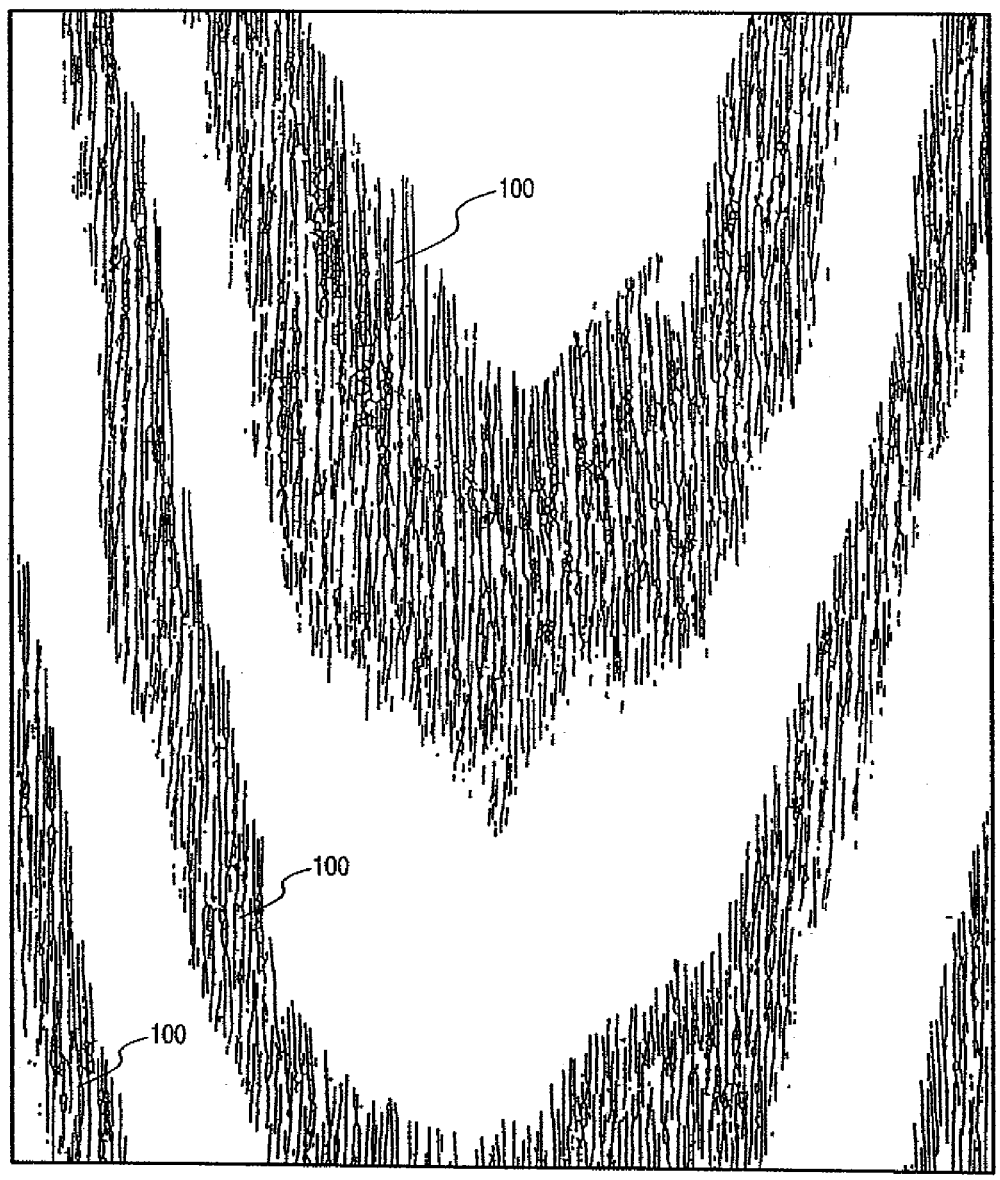
FIG. 6 is a is a fragmentary line art image magnified by 300%.

The first image is enhanced by increasing resolution, thereby creating an image of "flowing" ticks using filters such as available in computer software such as Photoshop™. Specifically, the size of the image is increased, preferably by about 300%. Resolution of the image is then increased, preferably from about 600 dpi to about 2400 dpi. In this way, the thickness of the ticks may be easily adjusted and spaced in the image to avoid etching lines that are too close to each other. Preferably, this adjustment involves scaling all ticks shown in the image based upon the thickest tick as the baseline or reference against which all other ticks are dimensioned. As described above, lines 30 are formed in a metal plate by etching around lines 30 and thereby forming gaps 38. As the acid eats into the metal, forming gaps 38, the acid has a tendency to bite into walls 36 of lines 30 and thereby widening gaps 38. If lines 30 are too narrow or "clumped" (i.e. adjacent gaps 38 are too close), the acid may etch completely through walls 36 of a line 30, thereby destroying such a narrow line 30. This is commonly known as "choking and spreading". In order to eliminate this problem, the image of the ticks is modified by adjusting the thickness and spacing of the ticks in the initial image (which will be lines 30 in the plate). A modified first image is created, referred to hereafter as the "line art image". The resulting enhanced line art image avoids clumping, while maintaining a precise simulation of the wood grain ticks from the initial image. A line art image magnified by 300% is shown in FIG. 6, showing several bundles of ticks 100.

Figure 7:
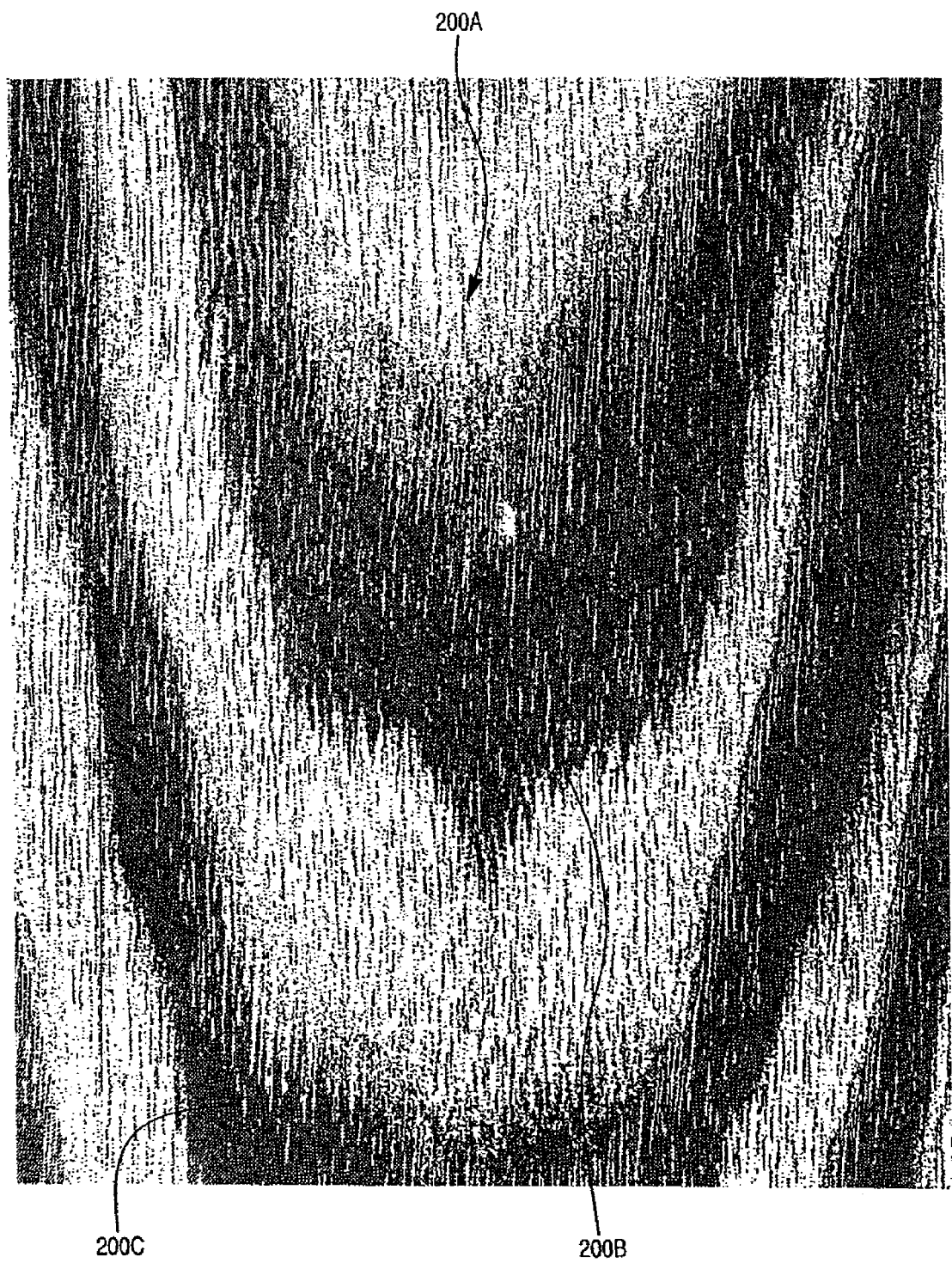
FIG. 7 is a fragmentary screen art image magnified by 300%.

The second image is enhanced by photographic or computer modeling techniques to control density of the wood tones. Preferably, the background of the initial image is combined with a 133 screen at 40% resolution. As known in the art, a 133 screen has 133 lines per inch. A resolution of 40% controls the density of the tones. Although screens are known in the printing industry, such conventional screening usually applies to geometric patterns and natural art such as leathers. The screen allows for modification and adjustment of the tones, thereby allowing the denser tones to etch. The resulting modified image is converted to film, thereby creating an enhanced second image, referred to hereafter as the "screen art image". A screen art image magnified by 300% is shown in FIG. 7, showing tonal variations 200A, 200B and 200C. The half tones are adjusted also so as to be sufficiently large to prevent them from being occluded by the molding material during the embossing or molding process.

Once useable film is rendered from the line art image and screen art image, it is developed into a photo sensitized lithography plate to be used as a pattern master. Preferably, the photography is applied to a pre-sensitized magnesium plate. A wax base material is applied to the master plate to create a pattern transfer. Different wax formulations are used for etching that correspond to the line art image ("line art wax"), and for etching that correspond to the screen art image ("screen art wax"). Preferably, bee's wax-based wax resist formulations are used, such as available from Custom Etch, Inc. of New Castle, Pa. The line art wax holds onto the plate longer during the etch process, as compared to the screen art wax. The screen art wax provides more detail, and drops off sooner in the etch process as compared to the line art wax.

The master plate is waxed, and a paper impression is then taken from the master plate. The wax clings to the paper where the pattern has been etched into the plate during the development process. The resulting wax transfer is lifted from the master plate using a flexible tissue carrier, and transferred to a metal plate to be etched after the plate has been thoroughly cleaned, leaving the wax resist art on the plate. If multiple pattern transfers are used, the transfers must be aligned and joined together. The transfer is burnished onto the surface and, with the use of a releasing agent, the tissue carrier is removed. Any match lines and fitted contours are blended using a liquid acid-resistant material to create a uniform pattern transition and blend. Preferably, the wax is left on the plate for about 24 hours before etching.

Preferably, the plate to be etched is a premium grade of steel with low carbon content. For example, SP300 steel, known in the art as "clean steel" may be used. Such premium grade steel is generally more homogenous than standard grade steel, and has a micrograin with tight cellular structure. Standard grade steel does not provide a tight cellular structure for the delicate line and screen etching required in the present invention, resulting in a rough background lacking definition.

After the wax resist art has been transferred to the plate, all areas outside of the plate which are not be etched are masked out using an acid resistant tape. This procedure is repeated in greater detail with close tolerance masking areas inside the plate that are not to be etched, thereby protecting untextured shutoffs, borders and nominal draft areas. Upon completion of this stage, all masking seams are sealed off with another wax base material to insure that no acid will leak into the protected area. The unmasked areas are then vapor honed. Vapor honing involves directing abrasive particles carried in water or air. Preferably, a mix of aluminum oxide and glass beading is used to satinize the desired texture area to aid in the adherence of the pattern transfer. After inspection, the mold is ready for etching.

Etching methods and acid formulas to be utilized are determined based on the type of metal, the desired depth of pattern, and the size of plate or die to be etched. The type of metal will determine the proper acid formula to be used. Preferably, a nitric based acid is used, such as available from Custom Etch, Inc. of New Castle, Pa. Etching depth is governed by the temperature of the mold and acid, the amount of time the mold is exposed to the acid, and the width of the lines of resist that are removed. The width and depth of the gaps being etched (and therefore the width and height of the lines being formed) is determined and adjusted based on the initial image. The wider the line of resist that is removed, the deeper the etch, and vice versa. The major lines are defined by gaps that are etched to a depth of between about 0.009 to 0.013 inches. More delicate lines are defined by gaps that are etched to a depth of between about 0.003 to about 0.008 inches. Correspondingly, the resulting lines range in height from between about 0.009 inches to about 0.013 inches. The taller lines 30 create a deeper groove 12, forming a darker, more prominent groove 12 on the exterior surface 10 after stain is applied. The depths may vary outside the preferred range depending on the species of wood being simulated.

The line art is etched in the acid bath for approximately 40-50 minutes. Following the line art etching, the plate is again cleaned to remove any acid and/or particulates. In addition, the plate is vapor honed and thoroughly washed with another acid formulation, or "post-wash", to remove any undercuts. The vapor honing and post wash also remove any sharp edges that may have formed during etching, thereby achieving soft, flowing lines by slightly rounding and polishing any sharp edges as well as removing any undercuts.

After the thorough cleaning and removal of undercuts, the etched line art is covered with the screen art wax. The plate is re-etched using a fast-acting acid for approximately 8-10 minutes. The tonal portions are etched to a depth of between about 0.012 to 0.013 inches, wherein the planar area 42 is etched to a depth of about 0.010 inches to about 0.013 inches, and the depression an additional depth of about 0.001 to about 0.003 inches from planar area 42. The plate is again cleaned and vapor honed to brighten the surfaces, and remove any resulting sharp edges and undercuts. However, the screen art is not post-washed with acid, given depressions 44 could be removed by post-washing. A layer of hard chrome is then applied to the finished etched plate, and resists wear after repeated embossing.

The resulting etched plate has a multi-level effect of line art integrated with screen art, as best shown in FIG. 5. This integration achieves flowing ticks and subtle tonal variations in a molded article embossed or formed with the disclosed etched plate, precisely simulating the qualities and appearance of natural wood. In addition, undercuts and sharp edges are eliminated, further enhancing the detail and crisp appearance of the line art.

Various substrates may be used to form an article having a wood grain pattern formed from the disclosed etched plate. Preferably, a polymeric substrate is used, such as sheet molding compound (SMC), polystyrene or polypropylene. However, it should be understood that various other substrates may be used in the present invention, such as medium density fiberboard (MDF), hard board, fiberboard, other wood composite materials, and other thermoplastic materials. The coloration of the resulting article is preferably a wood toned color. However, any base coloration may be used. Furthermore, stain or other dye may be applied to the article. Preferably, a stain having a heavy loading of pigment is used, in order to easily cling in the etched grooves and halftone portions.

Although the present invention has been described herein with respect to a molded door skin, it should be understood that the present invention is applicable to the formation of many other molded articles having wood grain patterns, such as wainscot, furniture doors, cabinet doors, paneling, decorative moldings, trim board, millwork, construction components, and the like.

It will be apparent to one of ordinary skill in the art that various modifications and variations can be made in construction or configuration of the present invention without departing from the scope or spirit of the invention. Thus, it is intended that the present invention cover all modifications and variations of the invention, provided they come within the scope of the following claims and their equivalents.

What is claimed is:

1. A molded door skin, comprising a molded component having a stainable exterior surface comprising molded grooves and molded halftone portions, the grooves configured with variable depths and lengths with respect to one another and variably spaced with respect to one another to collectively simulate an appearance of a naturally appearing wood grain tick pattern, the halftone portions configured to receive and retain sufficient stain to simulate an appearance of darkened naturally appearing wood grain background tone.

2. The molded door skin of claim 1, wherein a first area of the exterior surface has a first density of the halftone portions, wherein a second area of the exterior surface has a second density of the halftone portions, and wherein the first density differs from the second density so that when stain is received and retained in the halftone portions the first and second areas simulate naturally appearing wood background tones having different degrees of darkness.

3. The molded door skin of claim 1, wherein a first area of the exterior surface has a plurality of the halftone portions disposed between a first plurality of the grooves to provide a first tone when stain is received and retained in the halftone portions, wherein a second area of the exterior surface has none of the halftone portions between a second plurality of the grooves to provide a second tone when the exterior surface is stained, and wherein the first and second tones respectively of the first and second areas collectively provide a bi-tonal appearance.

4. The molded door skin of claim 1, wherein the molded component comprises at least one polymeric material selected from sheet molding compound, polystyrene, polypropylene, or combinations thereof.

5. The molded door skin of claim 1, wherein the molded door skin is sized as an interior or exterior passage door skin.

6. The molded door skin of claim 1, wherein the stainable exterior surface has stile regions and rail regions simulating stiles and rails of the molded door skin, the grooves in the stile regions extending substantially perpendicularly to the grooves in the rail regions.

7. The molded door skin of claim 1, wherein the halftone portions comprise recesses configured to receive and retain sufficient stain to simulate the appearance of the darkened naturally appearing wood grain background tone.

8. The molded door skin of claim 1, wherein:
the grooves are separated from one another by outer portions arranged on the exterior surface; and
a plurality of the halftone portions are situated in the outer portions between the grooves.

9. The molded door skin of claim 1, wherein:
the grooves are separated from one another by outer portions arranged on the exterior surface, the grooves having first depths; and
the halftone portions comprise recesses situated in the outer portions between the grooves and configured to receive and retain sufficient stain to simulate the appearance of the darkened naturally appearing wood grain background tone, the recesses having second depths that are less than the first depths.

10. A door selected from an interior passage door or an exterior passage door, the door comprising:
a frame having opposite first and second sides; and
a first molded door skin sized as an interior or exterior passage door skin, the first molded door skin secured to the first side of the frame and comprising a first molded component having a first stainable exterior surface comprising molded first grooves and molded first halftone portions, the first grooves configured with variable depths and lengths with respect to one another and variably spaced with respect to one another to collectively simulate an appearance of a first naturally appearing wood grain tick pattern, the first halftone portions configured to receive and retain sufficient stain to simulate an appearance of a first darkened naturally appearing wood grain background tone.

11. The door of claim 10, further comprising a second molded door skin secured to the second side of the frame and comprising a second molded component having a second stainable exterior surface comprising molded second grooves and molded second halftone portions, the second grooves configured with variable depths and lengths with respect to one another and variably spaced with respect to one another to collectively simulate an appearance of a second naturally appearing wood grain tick pattern, the second halftone portions configured to receive and retain stain to simulate an appearance of a second darkened naturally appearing wood grain background tone.

12. The door of claim 10, wherein a first area of the first stainable exterior surface has a first density of the first halftone portions, wherein a second area of the first exterior surface has a second density of the first halftone portions, and wherein the first density differs from the second density so that when stain is received and retained in the first halftone portions the first and second areas simulate naturally appearing wood background tones of different degrees of darkness.

13. The door of claim 10, wherein a first area of the first exterior surface has a plurality of the first halftone portions disposed between a first plurality of the first grooves to provide a first tone when stain is received and retained in the first halftone portions, wherein a second area of the first exterior surface has none of the first halftone portions between a second plurality of the first grooves to provide a second tone when the first exterior surface is stained, and wherein the first and second tones respectively of the first and second areas collectively provide a bi-tonal appearance.

14. The door of claim 10, wherein the first molded component comprises at least one polymeric material selected from sheet molding compound, polystyrene, polypropylene, or combinations thereof.

15. The door of claim 10, wherein the first stainable exterior surface has stile regions and rail regions simulating stiles and rails of the first molded door skin, the first grooves in the stile regions extending substantially perpendicularly to the first grooves in the rail regions.

16. The door of claim 10, wherein the first halftone portions comprise recesses configured to receive and retain sufficient stain to simulate the appearance of the first darkened naturally appearing wood grain background tone.

17. The door of claim 10, wherein:
the first grooves are separated from one another by outer portions arranged on the first stainable exterior surface; and
a plurality of the first halftone portions are situated in the outer portions between the first grooves.

18. The door of claim 10, wherein:
the first grooves are separated from one another by outer portions arranged on the first stainable exterior surface, the first grooves having first depths; and
the first halftone portions comprise recesses situated in the outer portions between the first grooves and configured to receive and retain sufficient stain to simulate the appearance of the first darkened naturally appearing wood grain background tone, the recesses having second depths that are less than the first depths.

19. A stained molded door skin, comprising a molded component having a stained exterior surface comprising molded grooves and molded halftone portions stained with a stain, the grooves configured with variable depths and lengths with respect to one another and variably spaced with respect to one another to collectively simulate an appearance of a naturally appearing wood grain tick pattern, the halftone portions retaining a sufficient amount of the stain to simulate an appearance of darkened naturally appearing wood grain background tone.

20. The stained molded door skin of claim 19, wherein a first area of the exterior surface has a first density of the halftone portions retaining a first amount of the stain to provide a first tone, wherein a second area of the exterior surface has a second density of the halftone portions retaining a second amount of the stain to provide a second tone, and wherein the first tone differs from the second tone to simulate multiple naturally appearing wood background tones of different degrees of darkness.

21. The stained molded door skin of claim 19, wherein a first area of the exterior surface has a plurality of the halftone portions disposed between a first plurality of the grooves to retain a first amount of the stain to provide a first tone, wherein a second area of the exterior surface has none of the halftone portions between a second plurality of the grooves to provide a second tone, and wherein the first and second tones respectively of the first and second areas collectively provide a bi-tonal appearance.

22. The stained molded door skin of claim 19, wherein the molded component comprises at least one polymeric material selected from sheet molding compound, polystyrene, polypropylene, or combinations thereof.

23. The stained molded door skin of claim 19, wherein the molded door skin is sized as an interior or exterior passage door skin.

24. The stained molded door skin of claim 19, wherein the stained exterior surface has stile regions and rail regions simulating stiles and rails of the stained molded door skin, the grooves in the stile regions extending substantially perpendicularly to the grooves in the rail regions.

25. A door selected from an interior passage door or an exterior passage door, the door comprising:
a frame having opposite first and second sides; and
a first stained molded door skin sized as an interior or exterior passage door skin, the first stained molded door skin secured to the first side of the frame and comprising a first molded component having a first stained exterior surface comprising molded first grooves and molded first halftone portions stained with a stain, the first grooves configured with variable depths and lengths with respect to one another and variably spaced with respect to one another to collectively simulate an appearance of a first naturally appearing wood grain tick pattern, the first halftone portions retaining a sufficient amount of the stain to simulate an appearance of a first darkened naturally appearing wood grain background tone.

26. The door of claim 25, further comprising a second molded door skin secured to the second side of the frame and comprising a second molded component having a second stained exterior surface comprising molded second grooves and molded second halftone portions stained with the stain, the second grooves configured with variable depths and lengths with respect to one another and variably spaced with respect to one another to collectively simulate an appearance of a second naturally appearing wood grain tick pattern, the second halftone portions configured to receive and retain additional stain to simulate an appearance of a second darkened naturally appearing wood grain background tone.

27. The door of claim 25, wherein a first area of the first exterior surface has a first density of the first halftone portions retaining a first amount of the stain to provide a first tone, wherein a second area of the first exterior surface has a second density of the first halftone portions retaining a second amount of the stain to provide a second tone, and wherein the first tone differs from the second tone to simulate multiple naturally appearing wood background tones of different degrees of darkness.

28. The door of claim 25, wherein a first area of the first exterior surface has a plurality of the first halftone portions disposed between a first plurality of the first grooves to retain a first amount of the stain to provide a first tone, wherein a second area of the first exterior surface has none of the halftone portions between a second plurality of the first grooves to provide a second tone, and wherein the first and second tones respectively of the first and second areas collectively provide a bi-tonal appearance.

29. The door of claim 25, wherein the first molded component comprises at least one polymeric material selected from sheet molding compound, polystyrene, polypropylene, or combinations thereof.

30. The door of claim 25, wherein the first stained exterior surface has stile regions and rail regions simulating stiles and rails of the first stained molded door skin, the first grooves in the stile regions extending substantially perpendicularly to the first grooves in the rail regions.

* * * * *